United States Patent [19]

Girard et al.

[11] Patent Number: 5,311,784
[45] Date of Patent: May 17, 1994

[54] DIMENSIONAL QUALITY CONTROL METHOD FOR CAST PARTS

[75] Inventors: Francis Girard, Viroflay; José Guezou, Jouy le Moutier; Jean-Claude Manceau, Taverny, all of France

[73] Assignee: Societe HISPANO-SUIZA, Saint Cloud, France

[21] Appl. No.: 795,742

[22] Filed: Nov. 21, 1991

[30] Foreign Application Priority Data

Nov. 21, 1990 [FR] France ................... 90 14495

[51] Int. Cl.$^5$ .............. G06F 15/46; G06F 15/60; G01B 21/02; G01B 21/30
[52] U.S. Cl. .................. 73/865.8; 364/474.17; 364/474.24; 364/552
[58] Field of Search ........... 73/865.8; 33/504, 505; 364/552, 551.02, 506, 562, 563, 564, 560, 474.17, 474.18, 474.19, 474.24

[56] References Cited

U.S. PATENT DOCUMENTS

| 3,944,798 | 3/1976 | Eaton ................... 364/559 |
| 4,628,531 | 12/1986 | Okomoto et al. .............. 382/8 |
| 4,896,278 | 1/1990 | Grove ................... 364/552 |
| 4,901,253 | 2/1990 | Iwono et al. ............. 364/550 X |
| 5,075,866 | 12/1991 | Goto et al. ............. 364/474.24 |
| 5,208,763 | 5/1993 | Hong et al. ............. 364/551.02 |

FOREIGN PATENT DOCUMENTS

| 3344350 | 1/1985 | Fed. Rep. of Germany ........... 364/474.24 |
| 2233665 | 1/1975 | France ................... 364/552 |
| 2194367 | 3/1988 | United Kingdom . |

OTHER PUBLICATIONS

"Monitoring Tasks on Boring and Milling Production Cells", 8286 Computers in Industry, 7 (1986) Feb., No. 1, Elsevier, Netherlands–Erdelyi and Santha pp. 65–71.
"Ein Expertensystem fur die Einrichtung und die Endkontrolle an CNC-Maschinen" 30 (1988) Aug., No. 8, Munich, W. Germany–Hammer, Hertzberg, Simon and Skerhut pp. 397–400.

Primary Examiner—Tom Noland
Attorney, Agent, or Firm—Bacon & Thomas

[57] ABSTRACT

A method for inspecting and ascertaining the quality of a cast workpiece for the dimensional quality control is used for cast workpieces in which both the rough, as cast workpiece, as well as the finished cast workpiece are initially described in a computer file of a computer aided drafting (CAD)system. The method includes the steps of positioning and spatially locating the workpiece on a support surface; providing a computer having a CAD file of both the as cast workpiece and the finished workpiece; selecting a zone of the workpiece to be inspected; conducting a shape analysis of the workpiece in the selected zone using a three dimensional measuring device operatively associated with the computer so as to transmit three dimensional measurement data to the computer; storing the measurement data relating to the selected inspection zone; comparing the measurement data with corresponding data in the CAD file for the workpiece; repeating the aforementioned steps until the entire workpiece has been inspected; and accepting or rejecting the workpiece based on the comparison of the measured data with the data in the CAD file. Additionally, the step of comparing the measurement data with the CAD file data may involve the steps of carrying out a first comparison between the measured data points and the CAD file for the rough, as cast workpiece and, if the result of this first comparison is outside of the predetermined tolerances, carrying out a second comparison between the measurement data and the CAD file data for the completed, finished workpiece.

8 Claims, 4 Drawing Sheets

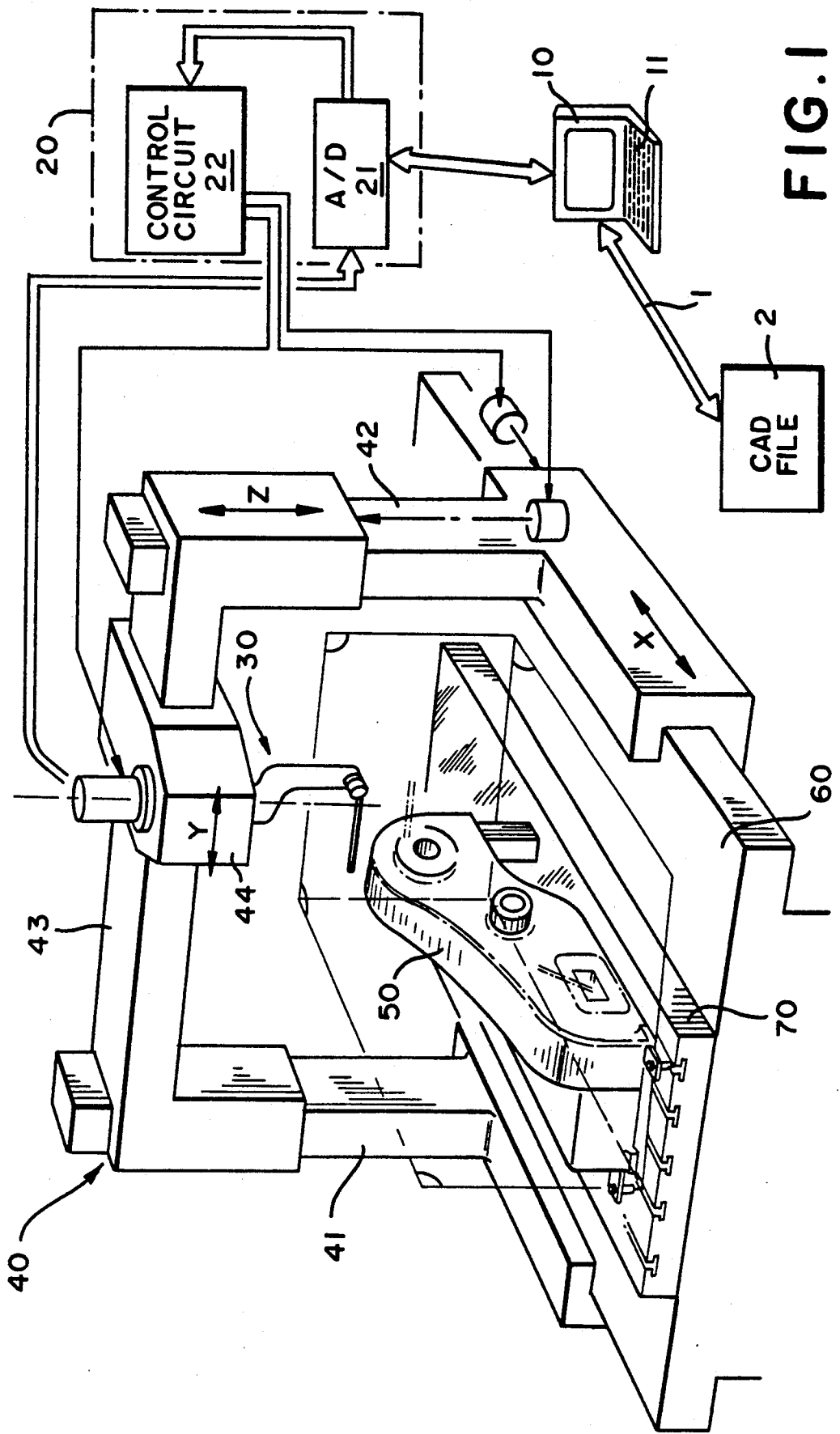

DIMENSIONAL QUALITY CONTROL METHOD FOR CAST PARTS

BACKGROUND OF THE INVENTION

The invention relates to method for the dimensional quality control of cast parts, more particularly such a method used for determining the quality of such cast parts having aeronautical applications.

As is well-known, quality control methods for ascertaining the quality of cast parts are applied to both the rough, or as cast, workpiece as well as to the finished workpiece. Typically, after the workpiece has been cast, it must undergo further machining operations to be brought into its final dimensions.

The known quality control methods typically comprise two steps: the step of checking the appearance of the workpiece by looking for burns, inspecting the surface quality for both the external surface of the workpiece as well as any passageways or orifices; and the step of checking the dimensions of the workpiece, either by manually measuring the dimensions, such as with a caliber, depth gauge, etc., or by using a template or the like.

The known quality control steps are usually carried out on the first workpieces produced by a new manufacturing run. Indeed, the initial parts may be subjected to a complete dimensional check, which may include cutting the part open to inspect any interior dimensions. Once the inspection has been satisfactorily completed, it is performed only on randomly selected manufactured workpieces.

To date, such quality control checks have been carried out entirely manually. The manual operations, which may include spot painting to emphasize markings previously applied by an operator with a scriber or a compass, are laborious and consume large amounts of time of skilled personnel. The steps may include: Placing the workpiece at the beginning of the manufacturing run; tracing outer or remote segments to insure that workpiece did not warp from any previous thermal treatment; tracing the axes and the bore hole framing lines in one plane; tipping the part onto another plane and repeating the above operations; and tracing and measuring several shapes.

Such time consuming operations cause production delays, thereby increasing the manufacturing costs of the workpiece. Typically, such quality control checks on a rough, as cast workpiece may take several weeks.

SUMMARY OF THE INVENTION

The present invention relates to a method for inspecting and ascertaining the quality of a cast workpiece which obviates the difficulties of the known methods. The instant method of dimensional quality control is used for cast workpieces wherein both the rough, as cast workpiece, as well as the finished cast workpiece were initially described in a computer file of a computer aided drafting (CAD) system.

The method according to the present invention utilizes the steps of positioning and spatially locating the workpiece on a support surface; providing a computer having a CAD file of both the as cast workpiece and the finished workpiece; selecting a zone of the workpiece to be inspected; conducting a shape analysis of the workpiece in the selected zone using a three dimensional measuring device operatively associated with the computer so as to transmit three dimensional measurement data to the computer; storing the measurement data relating to the selected inspection zone; comparing the measurement data with corresponding data in the CAD file for the workpiece; repeating the aforementioned steps until the entire workpiece has been inspected; and accepting or rejecting the workpiece based on the comparison of the measured data with the data in the CAD file.

Additionally, the step of comparing the measurement data with the CAD file data may involve the steps of carrying out a first comparison between the measured data points and the CAD file for the rough, as cast workpiece and, if the result of this first comparison is outside of the predetermined tolerances, carrying out a second comparison between the measurement data and the CAD file data for the completed, finished workpiece.

According to another feature of the invention, the method may utilize a preliminary stage wherein machining defects of the workpiece are ascertained by defining an initial plane, defining an orientation system and establishing the location of the workpiece on its support relative to the initial plane.

Once the second comparison, noted above, has been carried out and, if the workpiece falls outside acceptable tolerances, the method may also consist of determining if any adjustments may be carried out on the workpiece and, if such adjustments are carried out, rejecting the workpiece if it still remains beyond the acceptable tolerances. If, however, the adjustments are determined to render the workpiece acceptable, the method also comprises computing the necessary steps required to bring the finished workpiece within acceptable tolerances so as to compensate for any defects.

The measurement data may be determined by sweeping the surfaces of the zone to be inspected with a measuring instrument. The workpiece may be moved relative to the measuring apparatus in order to carry out the taking of the measurement data in the next zone to be inspected.

BRIEF DESCRIPTION OF THE DRAWINGS

FIG. 1 is a schematic diagram of the apparatus for carrying out the method according to the present invention.

DETAILED DESCRIPTION OF THE PREFERRED EMBODIMENT

Figure 2A:
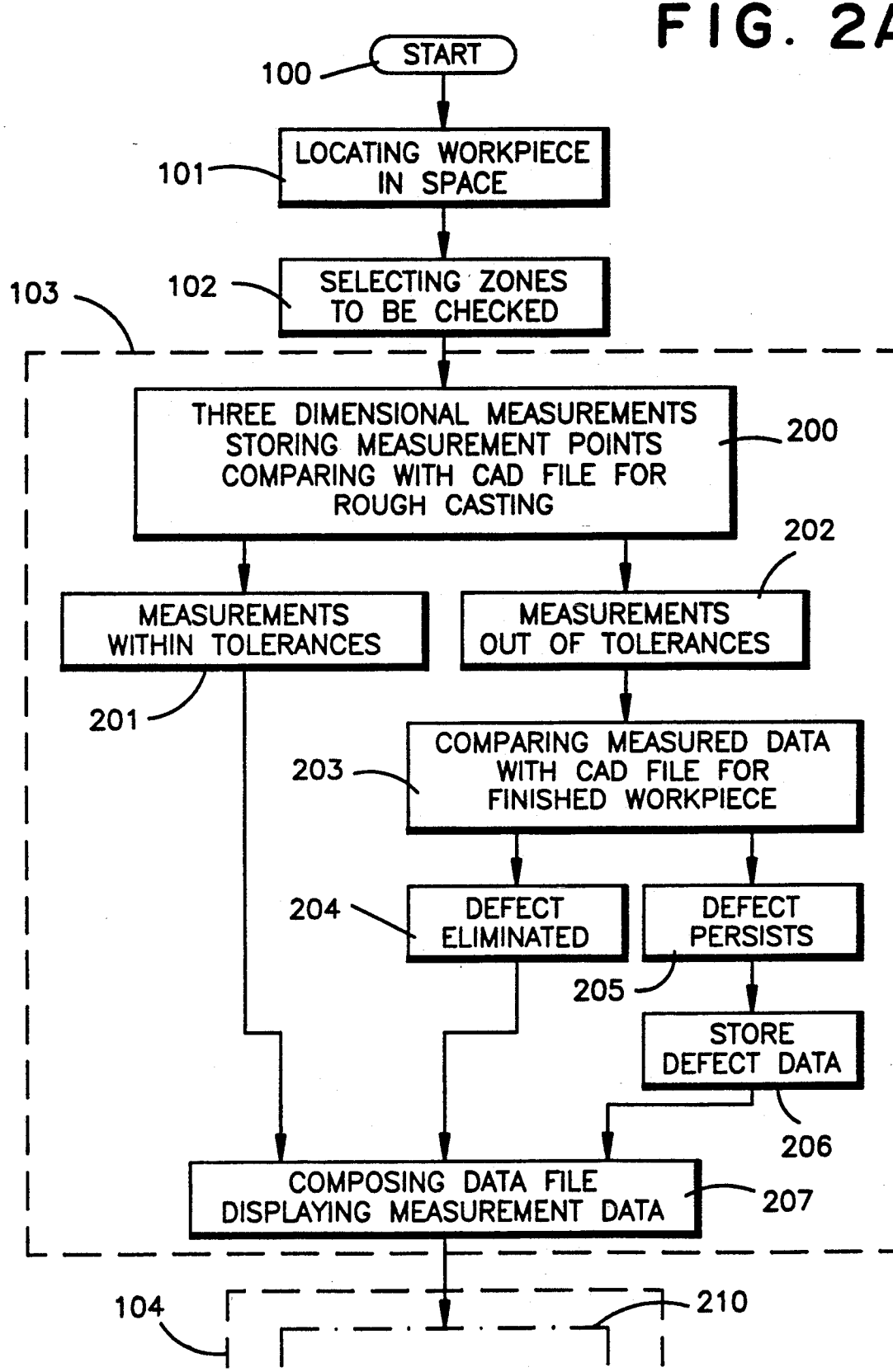
FIGS. 2A and 2B are flow charts of the steps of the method according to the present invention.

FIG. 1 schematically illustrates an apparatus to carry out a method according to the present invention. A local measurement processing means or terminal 10 is provided, which may consist of a computer or a microcomputer operatively connected by digital data transmission lines 1 to a central computer system 2 which contains the CAD file describing all of the workpieces to be inspected. This file contains data relating to the rough, as cast workpiece, as well as data relating to the finished workpiece. Typically, CAD files are formulated when the workpiece is being designed.

By using known techniques for image superposition, an operator working on keyboard 11 connected to the computer or microcomputer 10 can display the workpiece to be inspected on the screen of the computer or microcomputer the way it is described in the CAD file and as it is described by three dimensional measurement taken from the actual workpiece to be inspected. Thus, the actual workpiece may be visually displayed simultaneously with the workpiece according to the CAD file.

In order to start the zone selection step, mechanical and electronic means, when actuated by the measurement processing means 10, relatively displace the measuring means and the workpiece. Control and pre-processing means 20 are provided to connect the measuring means 30 with the computer terminal 10. Pre-processing means 20 may comprise a conversion circuit 21 and a control circuit 22. The control data emitted from the computer processing terminal 10 are transferred in the control circuit 22 into analog control signals. The control circuit 22 may comprise electronics able to drive the respective motors in the measuring apparatus 40.

The conversion circuit 21 converts the analog measurement signals from the measuring means 30 into digital signals, which are then transferred to the computer terminal 10.

The measuring device 30 is mounted on a beam 43 which interconnects uprights 41 and 42. Uprights 41 and 42 are movable along axis X. The beam 43 is displaceable along axis Z on the uprights 41 and 42. Measuring head 44, to which is attached the measuring means 30, is movable on beam 43 along the Y axis. Thus, as can be seen, the measuring means 30 is displaceable along three orthogonal axes relative to the stationary workpiece 50. The measuring device 30 may consist of a three-dimensional sensor in order to take three-dimensional measurements when swept along the surface of the workpiece 50. Measuring means 30 may also be formed as a portion of a robot.

The workpiece 50 to be inspected is placed on a support surface of a stage 70 which also provides a reference surface for the X, Y and Z axes as well as an origin point which is fixed in space, or a point fixed on the stage 70.

The rough, as cast workpiece 50 is mounted by the operator on the surface of the stage 70. In a first check, the operator verifies the initial conditions of the workpiece. These initial conditions may consist of determining an initial plane and an orientation system and may use two centering holes on the workpiece or a centering and a specific orientation of the workpiece. The operator, at this point, must also insure that the workpiece is stably attached to the support surface.

Figure 2B:
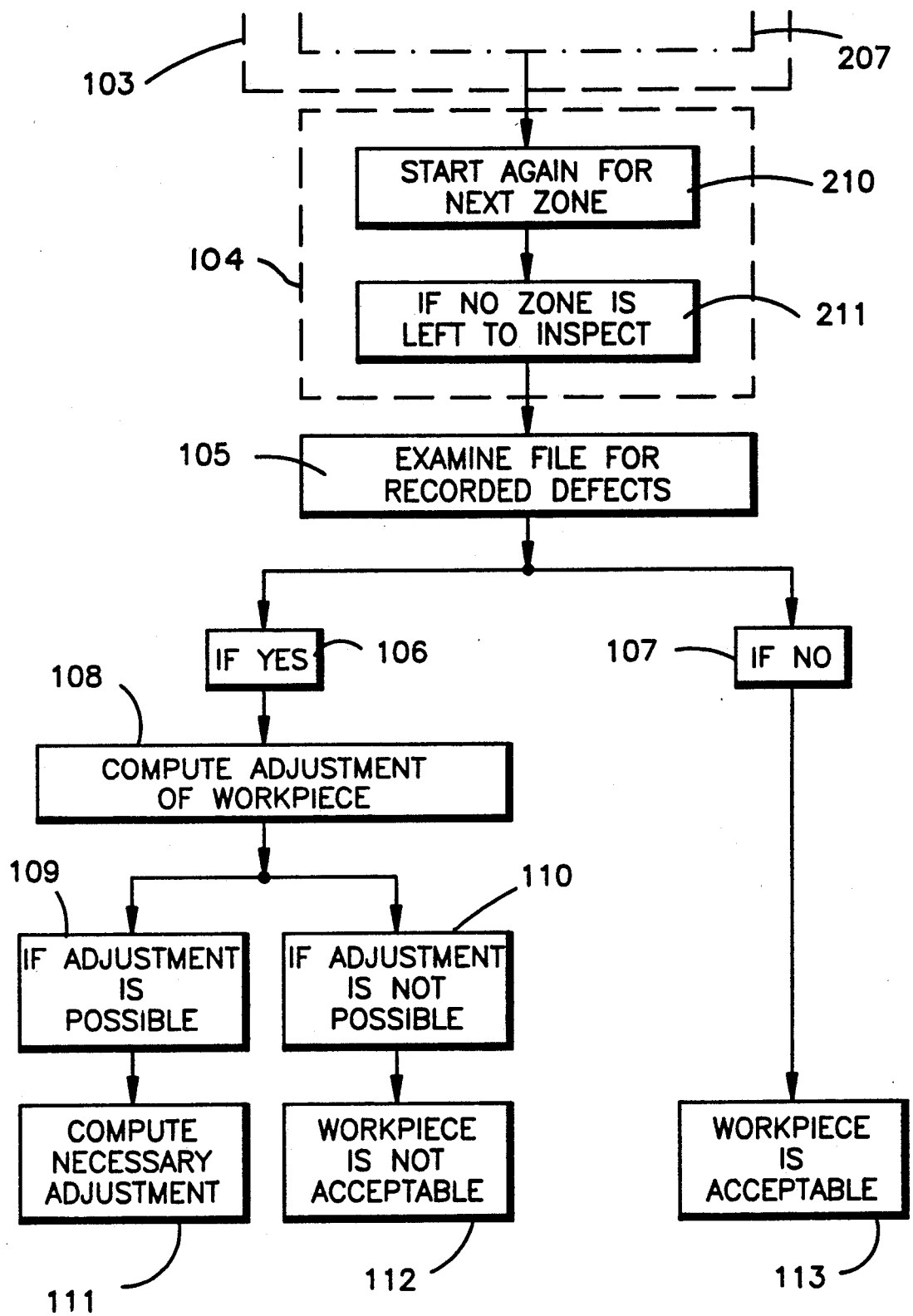

As shown in FIGS. 2A and 2B, the operator may then carry out the quality control inspection method according to this invention. The method comprises the steps of: (100) initiating the procedures; (101) locating the workpiece in space relative to the fixed reference; (102) selecting a zone of the workpiece to be inspected; (103) conducting a shape analysis of the selected zone, which may comprise the steps of: (200) conducting a three-dimensional measurment of the selected zones; (200) storing the three-dimensional measurement data; comparing the three-dimensional measurement data from the measuring device with the data in the CAD file and storing the comparison results; and accepting or rejecting the workpiece on the basis of these comparisons.

Preferably, the method includes the step of composing a file of the collected three-dimensional measurement data (207) and visually displaying this data on the screen of the computer terminal 10.

The above steps are carried out for each of the zones on the workpiece until the entire workpiece has been inspected. At the end of the analysis for each selected zone, the measuring means 30 is automatically moved (210) in order to carry out new three-dimensional data measurements in the next zone. A check (211) is made after the completion of each zone to determine if there are any additional zones left to be inspected.

If there are no additional zones to be inspected, the method examines the stored data to look for any recorded defects (105). If there are no defects (107) the part is deemed to be acceptable (113).

If there are noted defects (106) the method includes the step of (108) determining if the workpiece can be fixed or adjusted so as to yield an acceptable, final workpiece. If it is not possible to obtain an acceptable finished workpiece from the as cast workpiece (110) the workpiece is rejected as being unacceptable (112). If, however, the method determines that it is possible, despite the defects, to achieve an acceptable finished workpiece (109), the method may then comprise the additional step of carrying out a computation (111) of the changes or adjustments necessary in order to match the data in the CAD file. The operator may carry out this computation from the keyboard 11 of the computer terminal 10.

The comparison (200) of the measurement data with the CAD file for the rough, as cast workpiece may comprise following steps: Comparing the three-dimensional measurement data with the data from the CAD file for the as cast workpiece; (201) accepting the part if this comparison indicates that the measured data falls within the tolerances of the data in the CAD file; if, however, the comparison indicates that the measured data falls outside the acceptable tolerances (202), a second comparison is carried out with the data in the CAD file for the completed, finished workpiece (203); if the workpiece still falls outside the acceptable tolerances after this second comparison (205) the defects are stored (206); if the second comparison eliminate the defect (204), the results of the comparison one stored (206).

Figure 3A:
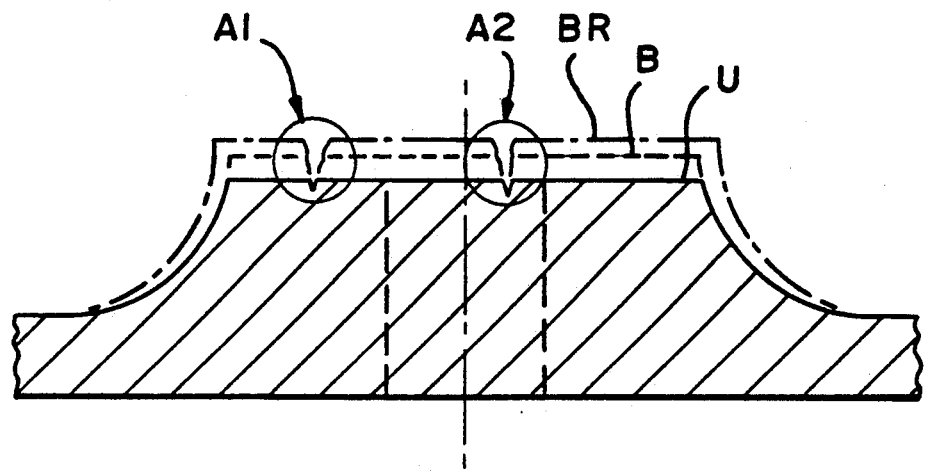
FIGS. 3A and 3B are schematic illustrations of visual displays of a selected zone of the workpiece utilized to carry out the steps of the present method.

FIG. 3A schematically illustrates the visual comparison which may be displayed on the screen of the computer terminal 10. The finished workpiece shape according to the CAD file is illustrated at U, the desired as cast shape, according to the CAD file is illustrated at B, and the actual as cast configuration is illustrated at BR. The superposition of these three shapes illustrate defects A1 and A2. As can be seen, the defect A1 will cause the workpiece to be unacceptable, since it extends into the shape of the finish workpiece. However, defect A2 will not result in the rejection of the as cast workpiece, since it will be eliminated when the workpiece is finished machined by drilling the hole though the workpiece.

Figure 3B:
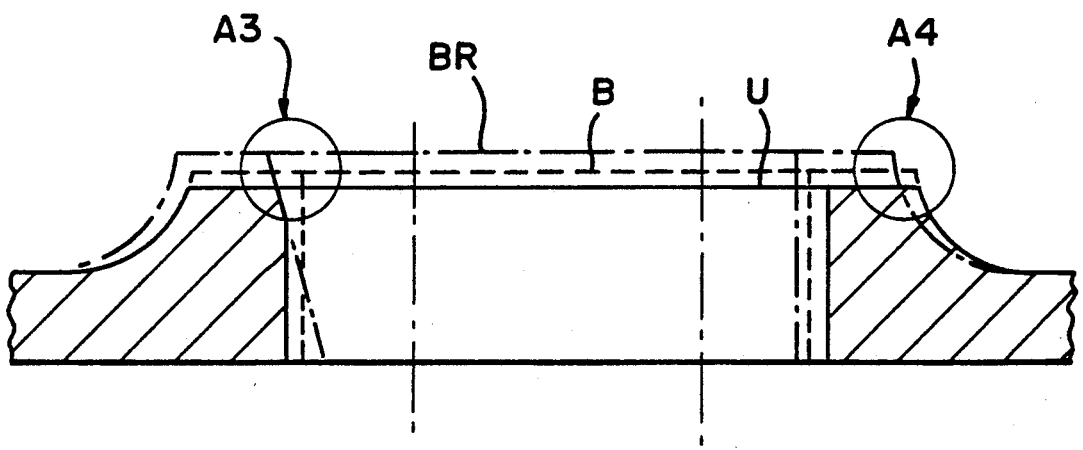

FIG. 3B is a similar illustration of a different zone of the workpiece. Again, the desired finished shape of the workpiece according to the CAD file is denoted by U, the desired as cast shape according to the CAD file us illustrated by B and the actual as cast configuration illustrated at BR. A defect in area A3 would not be acceptable in the finished workpiece since it affects a surface of the opening to be later formed in the finished workpiece. However, a defect in area A4 would not result in the workpiece being rejected, since it merely affects a rest surface.

The foregoing description is provided for illustrative purposes only and should not be construed as in any way limiting this invention, the scope of which is defined solely by the appended claims.

We claim:

1. A method for inspecting and ascertaining the quality of a cast workpiece comprising the steps of:
   a) providing a computer having a computer assisted design (CAD) file of both the as cast workpiece and the finished workpiece;
   b) positioning and spatially locating the workpiece on a support surface;
   c) selecting a zone of the workpiece to be inspected;
   d) conducting a shape analysis of the workpiece in the selected zone using a three-dimensional measuring means operatively associated with the computer so as to transmit three-dimensional measurement data to the computer;
   e) storing the three-dimensional measurement data relating to the selected inspection zone;
   f) comparing the three-dimensional measurement data with data in the CAD file for the workpiece, wherein the step of comparing the three-dimensional measurement data comprises the steps of:
      i) carrying out a first comparison between the three-dimensional measurement data and the CAD file data for the as cast workpiece;
      ii) carrying out a second comparison between the three-dimensional measurement data and the CAD file data for the finished workpiece if, in the first comparison, the three-dimensional measurement data falls outside a tolerance range for the as cast workpiece;
      iii) storing the comparison data relating to the second comparison;
      iv) determining the spatial dimensions of the as cast workpiece if the second comparison indicates the workpiece falls outside a predetermined tolerance range;
      v) comparing the spatial dimensions of the workpiece to its theoretical volume including tolerances; and,
      vi) determining any adjustments which may be necessary in order for the workpiece to match the CAD file data for the as cast workpiece;
   g) repeating steps c) through f) until substantially the entire workpiece has been analyzed; and,
   h) accepting or rejecting the workpiece based upon the comparison of the three-dimensional measurement data and the CAD file data.

2. The method of claim 1 comprising the additional step of subjecting the workpiece to a preliminary stage wherein the presence of any machinery defects is ascertained.

3. The method of claim 2 wherein the preliminary stage comprises the additional steps of:
   a) defining a initial plane;
   b) defining an orientation system; and,
   c) establishing the location of the workpiece on its support relative to the initial plane.

4. The method of claim 1 wherein the step of conducting a shape analysis for the workpiece comprises the step of sweeping a surface of the selected zone with a measurement apparatus.

5. The method of claim 4 comprising the additional step of relatively moving the workpiece and the measurement apparatus such that the next selected zone may be inspected.

6. The method of claim 1 comprising the additional step of:
   a) visually displaying the selected zone of the workpiece; and,
   b) visually displaying the selected zone of the workpiece in the CAD file.

7. The method of claim 6 wherein the step of displaying the selected zone of the workpiece in the CAD file comprises the step of displaying the selected zone in both the as cast and finished configurations.

8. A method for inspecting and ascertaining the quality of a cast workpiece comprising the steps of:
   a) providing a computer having a computer assisted design (CAD) file of both the as cast workpiece and the finished workpiece;
   b) positioning and spatially locating the workpiece on a support surface;
   c) subjecting the workpiece to a preliminary stage wherein the presence of any machinery defects is ascertained, wherein the preliminary stage comprises the additional steps of:
      i) defining a initial plane;
      ii) defining an orientation system; and,
      iii) establishing the location of the workpiece on its support relative to the initial plane;
   d) selecting a zone of the workpiece to be inspected;
   e) conducting a shape analysis of the workpiece in the selected zone using a three-dimensional measuring means operatively associated with the computer so as to transmit three-dimensional measurement data to the computer;
   f) storing the three-dimensional measurement data relating to the selected inspection zone;
   g) comparing the three-dimensional measurement data with data in the CAD file for the workpiece;
   h) repeating steps c) through f) until substantially the entire workpiece has been analyzed; and,
   i) accepting or rejecting the workpiece based upon the comparison of the three-dimensional measurement data and the CAD file data.

* * * * *